United States Patent [19]

Meynier et al.

[11] Patent Number: 4,594,937

[45] Date of Patent: Jun. 17, 1986

[54] SERVOMOTOR FOR BRAKING ASSISTANCE

[75] Inventors: Guy Meynier, Aulnay sous Bois; Alain Thioux, Chennevieres, both of France

[73] Assignee: Societe Anonyme D.B.A., Paris, France

[21] Appl. No.: 701,900

[22] Filed: Feb. 15, 1985

[30] Foreign Application Priority Data

Feb. 22, 1984 [FR] France .................. 84 02655

[51] Int. Cl.$^4$ ............................................. F15B 9/10
[52] U.S. Cl. ............................................. 91/369 R; 91/376 R
[58] Field of Search ............... 91/369 C, 369 A, 369 B, 91/369 R, 376 R; 137/627.5

[56] References Cited

U.S. PATENT DOCUMENTS

| | | | |
|---|---|---|---|
| 2,949,892 | 8/1960 | Ayers, Jr. ............................ | 91/369 B |
| 3,410,178 | 11/1968 | Kytta ................................... | 91/369 A |
| 3,688,647 | 9/1972 | Kytta ................................... | 91/369 A |

FOREIGN PATENT DOCUMENTS

| | | |
|---|---|---|
| 3300829 | 7/1983 | Fed. Rep. of Germany . |
| 2118925 | 8/1972 | France . |
| 2502567 | 10/1982 | France . |
| 2506402 | 11/1982 | France . |
| 2528780 | 12/1983 | France . |
| 2082275 | 3/1982 | United Kingdom ............. 91/369 A |
| 2121898 | 1/1984 | United Kingdom . |

Primary Examiner—Robert E. Garrett
Assistant Examiner—Mark A. Williamson
Attorney, Agent, or Firm—Larry J. Palguta; Ken C. Decker

[57] ABSTRACT

The servomotor incorporates a component (30) for retaining and for positioning the plunger (12) forming the moveable seat (11) for the valve means (9), the component (30) consisting of a plate incorporating a U-shaped central portion lying in a radial cavity (18) of the valve body (8) and cooperating with a shoulder (47) of the plunger (12), and a portion outside the valve body (8) pivoting about an axis Z carried by the valve body and having an end (42) coming into abutment, in the rest position, against a ring (43) mounted in the neck (21) of the casing (1).

12 Claims, 5 Drawing Figures

SERVOMOTOR FOR BRAKING ASSISTANCE

The present invention concerns servomotors for braking assistance, particularly for motor vehicles, and more especially pneumatic servomotors of the type incorporating a casing, a piston structure dividing the casing internally into two chambers, a distribution valve means situated in a valve body firmly fixed centrally to the piston structure and actuated by an input component to create selectively a pressure differential between the chambers, the valve means incorporating a plunger mounted so as to slide in the valve body, joined to the input component and defining, at one of its ends, a moveable valve seat, a fixed valve seat formed by the valve body, concentric with the moveable valve seat, a valve means mounted in the valve body and elastically pushed towards the fixed and moveable valve seats, a return spring bearing against the valve body and pushing the input component in the opposite direction to that of the fixed and moveable valve seats, and a retaining component lying in the valve body and incorporating a first zone co-operating in contact engagement with a shoulder of the plunger and a second zone, outside the valve body, intended to co-operate in abutment with a stationary component firmly fixed to the casing in order to determine, in the configuration of the servomotor at rest, the rest position of the plunger.

Such a servomotor is described, for example, in British Patent GB-A-1,515,690, in which the retaining component consists of an internal extension of the sheet metal disc forming part of the piston structure, or in French Patent Application FR-A-2,480,692, in which the retaining component consists of a key carried by the piston structure or the plunger. In the latter case, the retaining component or key is designed so as to be able to move in translation along the general axis of the servomotor relative to the valve body in an arrangement which is not, however, able to ensure reliable and accurate displacement of the retaining component relative to the valve body, nor to avoid the risks of interference with the relative movement of the plunger or of the retaining component becoming skewed relative to the plunger and/or the valve body.

The aim of the present invention is to propose a novel arrangement of a servomotor of the type defined above, incorporating a retaining component associated with the valve body in such a way as to ensure reliable and accurate displacement of this retaining component relative to the valve body, thus ensuring positioning of the plunger which is accurate and also insensitive to the conditions of use of the servomotor, allowing an optimum lift of the valve means during the period when braking is released to be maintained permanently, together with actuation dead travel which is reduced and whose accuracy is increased owing to the reduction permitted in the series of manufacturing dimensions.

To achieve this, according to a characteristic of the invention, the retaining component is mounted in the valve body so as to pivot about an axis perpendicular to the direction of sliding of the plunger and incorporates a third zone intended, when the retaining component hinges about the said axis, to co-operate in abutment with a corresponding surface of the valve body in order to determine for the plunger a position of maximum retraction relative to the valve body under the effect of the return spring.

According to a more particular characteristic of the invention, the retaining component consists of a plate shaped so that it has a U-shaped central portion lying in a radial cavity of the valve body and cooperating, at its free end forming the said first zone, with a peripheral groove in the plunger forming the shoulder, and a U-shaped external portion whose arms extend each side of the valve body, outside the latter, beyond the free end of the central portion, the free ends of the external portion pivoting on a shaft means mounted in the valve body.

According to another particular characteristic of the invention, the valve body slides in a sealed manner in a central neck of the casing and an annular component is provided mounted in this neck so as to form an abutment for a finger folded back from the opposite end of the plate to the free ends of the U-shaped external portion and forming the second zone of the retaining component.

Other characteristics and advantages of the present invention will emerge from the following description of an embodiment, given by way of illustration but not in any way limiting, with reference to the accompanying drawings, in which.

Figure 1:
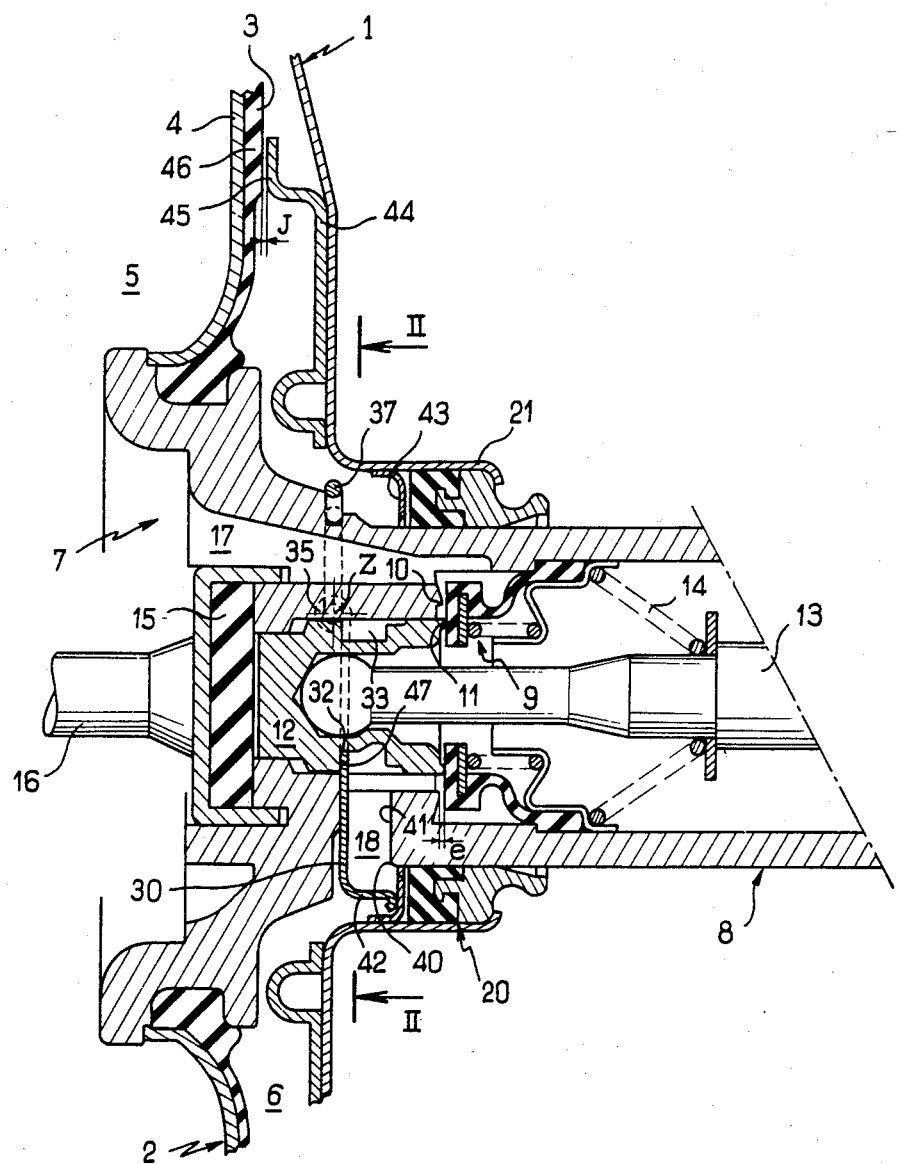
FIG. 1 is a partial view in longitudinal section of an assistance servomotor according to the invention.

The servomotor for braking assistance according to the invention, of the general type described in the documents mentioned above, incorporates a casing 1, (of which only the central portion of the rear shell is shown in the figures) divided internally by a piston structure 2, consisting conventionally of a membrane 3, made of elastomeric material, and a support disc 4 made of metal, into two chambers, typically a front chamber 5 intended to be permanently joined to a source of vacuum, and a rear chamber or working chamber 6 intended to be joined selectively to the front chamber 5 or to the atmosphere by a distribution valve means, as will be seen further. The piston structure 2 is fixed centrally to a hub 7, typically made of plastic, extending towards the rear and towards the outside by a tubular valve body 8. In this valve body 8 a valve means is mounted, elastically pushed and given the general reference 9, which is intended to co-operate with a fixed valve seat 10 formed centrally in the valve body, and with a moveable valve seat 11, formed at the rear end of a plunger 12 sliding in a central housing of the valve body and firmly fixed to an input and actuating rod 13 intended to be joined to a brake pedal of a motor vehicle. Also in a conventional manner, the rod 13 (and therefore the plunger 12) is pushed towards the rear by a return spring 14 bearing against a shoulder of the rod 13 and against a shoulder inside the valve body 8, formed in this case by the mounting sleeve of the valve means 9. The plunger 12, at its opposite end from the rod 13, co-operates in thrust with a reaction disc made of elastomeric material 15 interposed between the plunger 12 and the output rod 16 of the servomotor intended to actuate the piston of a master cylinder. In the rest position shown in FIG. 1, the valve means 9 bears against the moveable valve seat 11 and is separated by the latter from the fixed valve seat 10 by a distance e, thus allowing communication between the chambers 5 and 6 through a longitudinal passage 17 and a radial cavity 18 formed in the hub 7/valve body 8 assembly. In operation, when the rod 13 is driven towards the left, the valve means 9 comes to bear against the fixed valve seat 10 while continuing to bear against the moveable valve seat 11, thus interrupting communication between the two chambers 5 and 6, an additional displacement of the rod 13 in the same direction separating the moveable valve seat 11 from the valve means 9 (held so as to bear against the fixed valve seat 10) so as to admit air from the atmosphere in a controlled manner into the rear chamber 6, the air coming from outside through the internal passage formed in the tubular valve body 8. An important characteristic of this type of servomotor lies in the dead actuating travel represented by the clearance e existing at rest between the valve means 9 and the fixed valve seat 10. It will be understood that, the valve means 9 being elastically pushed in the direction of the moveable seat 11 and the fixed seat 10, this clearance e is determined by the position at rest of the plunger 12 relative to the valve body 8, which must itself, together with the piston structure 2, be positioned relative to the casing 1 mounted on a fixed structure of the vehicle. As will be observed in FIGS. 1 and 5, the tubular valve body 8 extends so as to slide and be sealed through a guiding and sealing assembly 20 mounted in a rear tubular extension or neck 21 of the casing.

Figure 2:
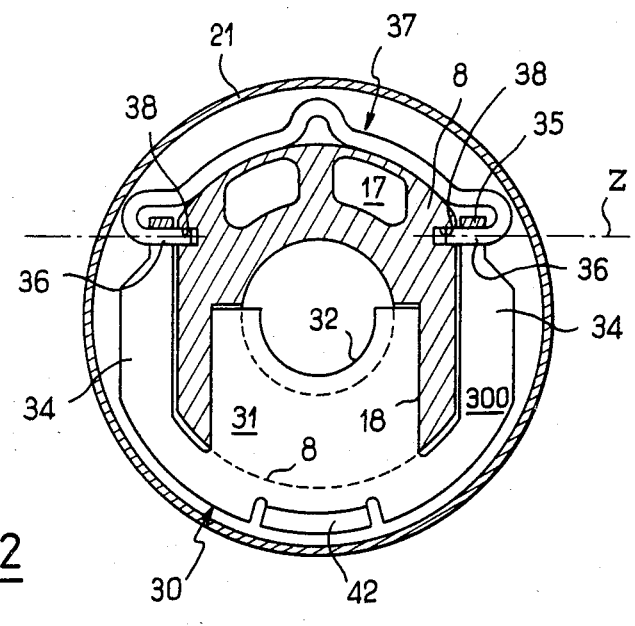
FIG. 2 is a view in transverse section along the section line II—II shown in FIG. 1.

In accordance with the invention, positioning of the plunger 12 is provided by a retaining component 30 made from a plate made of thin sheet metal, of thickness less than 1.5 mm and shaped so that it has, as shown more clearly in FIG. 2, a U-shaped central portion 31 defining, at its free end, a central semi-circular notch 32 of a diameter slightly greater than that of the bottom of a peripheral groove 33 of the plunger 12 into which this free end of the central portion 31 enters while extending radially into the cavity 18 of the valve body 8, whose width is appropriately dimensioned. The plate 30 also incorporates an external portion also in shape of a U 300, co-planar with the previous portion and formed by two arms 34 extending from the central zone of the first portion 31 opposite the notch 32 so as to extend beyond the free end of the central portion 31 defining the notch 32, the ends of the arms 34 being bent back, as shown at 35, in order to pivot on two end portions arranged in line and directed towards one another 36 of a clip made of metal wire 37 having the general configuration of a C, the end portions 36 being engaged in blind holes 38 formed in the opposite lateral walls of the valve body 8, the body of the clip 37 bearing elastically against the periphery of the valve body 8 while remaining inscribed inside the circle of the neck 21 of the casing 1.

Figure 4:
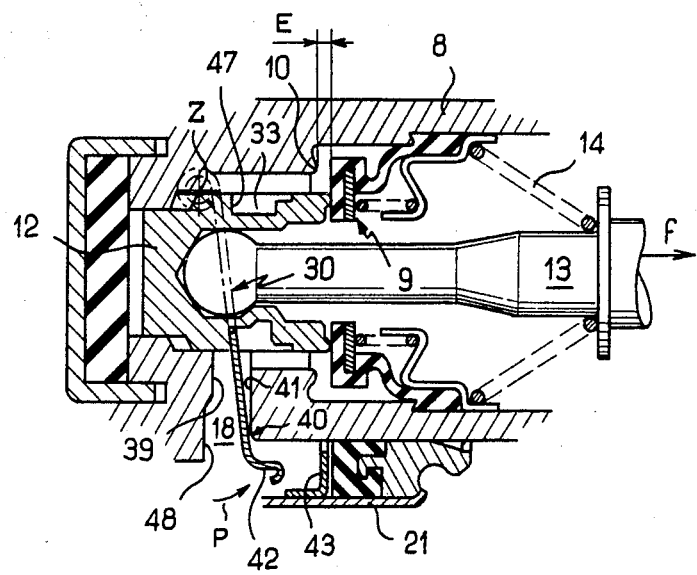
FIG. 4 is a view similar to that shown in FIG. 3 showing the arrangement of these components at the start of a return phase corresponding to release of the braking pressure.

The cavity 18 is dimensioned transversely so as to house freely the central portion 31 of the plate 30, and axially so as to allow hinging of the plate through an angle greater than 7° about the axis Z of the shaft portions 36 between a rest position, shown in FIG. 1, in which the central portion 31 of the plate 30 bears so as to lie flat against the front wall 39 of the cavity 18, and a fully hinged position, shown in FIG. 4, in which the central zone of the central portion 31 comes to bear against the outer radial end 40 of the rear wall 41 of the cavity 18. As shown in the figures, the opposite outer end from the notch 32 of the central portion 31 of the plate 30 incorporates a finger folded back towards the rear 42, lying essentially perpendicular to the general plane of the plate 30 and having advantageously an end which is bent back and intended to come into abutment against a collar made of metal 43 mounted in the neck 21 ahead of the guiding and sealing assembly 20. The casing 1 advantageously incorporates an annular reinforcement 44 adding rigidity to the rear wall of the casing 1 with regard to fixing screws. This reinforcement 44, surrounding the valve body 8, has outer portions folded towards the interior capable of forming abutment surfaces 45 for pads 46 of the membrane 3 of the piston structure 2.

With the arrangement described above, in the configuration of the servomotor at rest shown in FIG. 1, the central portion 31 of the plate 30 bears so as to lie flat against the front wall 39 of the cavity 18, and by the end of the finger 42, against the collar 43, the plate 30 thus defining a plane of reference and positioning for the plunger 12 of which the front shoulder 47 of the groove 33 bears against the central portion 31 under the effect of the return spring 14. The valve body 8 and the piston structure 2 are also positioned with regard to this reference plane determined by the position of the collar 43 to ensure a minimum and constant clearance e between the valve means 9 and the fixed valve seat 10, together with a slight clearance J between the pads 46 of the membrane 3 and the adjacent bearing faces 45 of the reinforcement 44.

Figure 3:
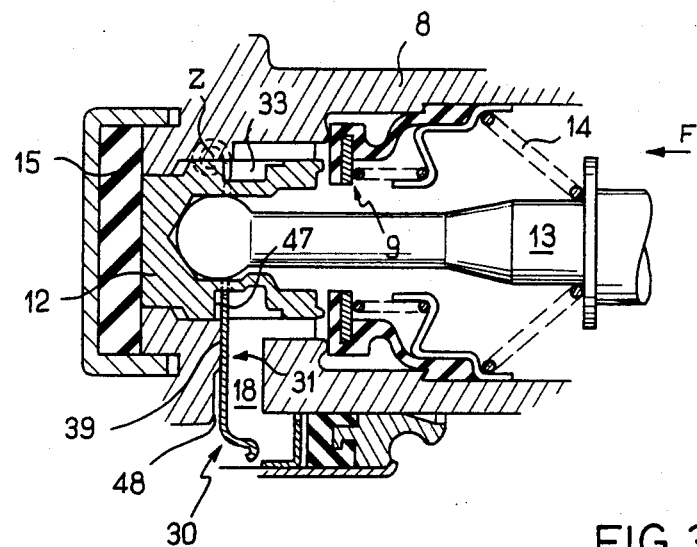
FIG. 3 shows diagrammatically the arrangement of the component parts of the valve means during a period of actuation so as to create a braking pressure.

When the rod 13 is driven inwards in the direction of the arrow F shown in FIG. 3, so as to exert a braking pressure, the plunger 12 moves forward compressing the disc 15, the front shoulder 47 of the groove 33 moving away from the central portion 31 of the plate 30, held flat against the front wall 39 of the cavity 18. When, starting from this position, the force exerted on the rod 13 is released, the latter moves, under the effect of the return spring 14, towards the rear in the direction of the arrow f shown in FIG. 4 thus causing a relative displacement towards the rear of the plunger 12 relative to the valve body 8. In so doing, the shoulder 47 of the groove 33 becomes to bear against the central portion 31 of the plate 30 and causes the latter to hinge in the direction of the arrow P until the outer end of the central portion 31 comes to bear against the end 40 of the rear wall 41 of the cavity 18, as mentioned above, thus defining an extra wide opening E of the valve means 9 relative to the fixed valve seat 10 permitting rapid depressurization of the rear working chamber 6 of the servomotor so as to enable the latter to regain rapidly an equilibrium position. If the force exerted on the rod 13 is completely released, the piston structure 2/hub 7/valve body 8/plunger 12/rod 13 assembly is returned towards the rest position of the servomotor, that is to say that starting from the configuration shown in FIG. 4 maintained until now, the end of the finger 42 comes to bear against the collar 43 so as mutually to reposition the plunger and the valve body 8 together with the latter (with the piston structure 2) relative to the casing 1.

Figure 5:
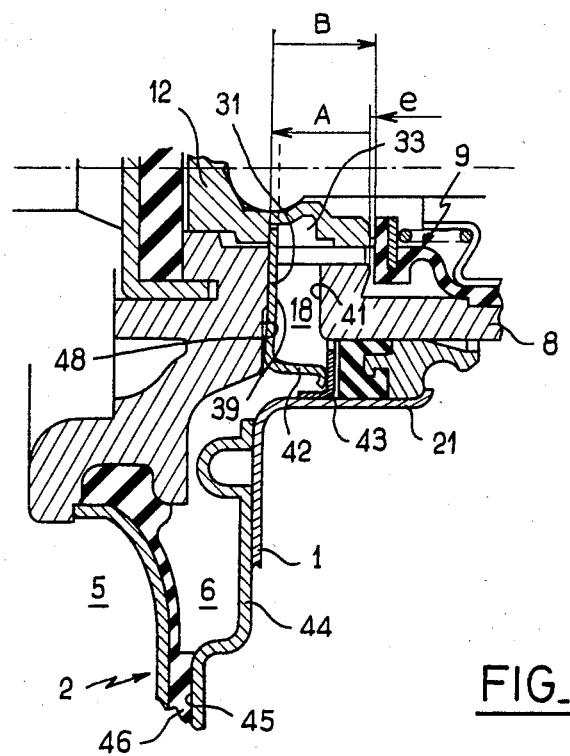
FIG. 5 is a partial view in transverse section similar to that shown in FIG. 1, showing the elastic deformation of the retaining component during a pulling test.

Under certain conditions, imposed by national regulations, particularly during tests known as pulling tests, the servomotor may be pulled in tension in such a way that the membrane 3 comes to bear, by the intermediary of its pads 46, against the bearing faces 45 of the reinforcement 44. To avoid in this case damage to the retaining component 30 and loss of the references mentioned above, a slight step towards the front 48 is advantageously provided in the end situated radially towards the outside of the front wall 39 of the cavity 18. Thus, as shown in FIG. 5, when the pad 46 is brought to bear against the bearing surface 45 of the reinforcement 44, the central portion 31 of the plate 30 with its finger 42 bearing against the collar 43, can bend elastically into the step 48 without causing further permanent deformation of the finger 42 or of this central portion 31 of the plate 30. As indicated in this same FIG. 5, the accuracy obtained for the dead travel of opening e is high because the series of dimensions is reduced to the minimum over the characteristic distances A and B, respectively between the plane of the fixed valve seat and the plane of the radially inner zone of the front face 39 of the opening 18 (and hence of the front face of the central portion 31 of the plate 30) and between the latter plane and the plane of the moveable valve seat. It will be observed, moreover, that the required mounting position for the collar 43 can be determined, and possibly slightly varied, with great accuracy.

We claim:

1. A braking assistance servomotor comprising:
   a casing,
   a piston structure dividing said casing internally into two chambers,
   distribution valve means situated in a tubular valve body firmly fixed centrally to said piston structure and actuated by an input member to create selectively a pressure differential between said chambers,
   said distribution valve means comprising:
   a plunger mounted so as to slide axially in said valve body, coupled to said input member and defining at one end a movable valve seat;
   a valve body seat formed internally by said valve body, concentric with said movable valve seat;
   a valve member mounted in said valve body and resiliently biased toward said valve body seat and movable valve seat;
   a return spring supported in said valve body and biasing said input member in a direction away from said valve body and movable valve seat, and
   further comprising a retaining member having a first portion extending into a radial recess in said valve body for cooperation in abutment with a peripheral shoulder of said plunger and a second portion outside said valve body for cooperation with a stationary component in fixed relationship relative to said casing, said retaining member having the second portion pivotingly supported on said valve body by shaft means mounted in said valve body and extending perpendicular to a direction of sliding of said plunger, said radial recess having an axial extension such that, when said retaining member is pivoted about said shaft means in a direction toward said valve member under the effect of said return spring, a zone of said first portion of said retaining member comes into abutment with a corresponding radial end surface of said radial recess adjacent said valve member and remote radially from said shaft means, so as to determine for said plunger a position of maximum retraction relative to said valve body seat, said retaining member comprising a plate shaped so that said first portion has a U-shaped configuration with a free end cooperating in abutment with said peripheral shoulder of said plunger and said second portion also has a U-shaped configuration with arms extending about each side of said valve body and beyond said free end of said first portion, said arms having free arm ends journaled on said shaft means mounted in said valve body, and said second portion of said retaining member formed centrally with a finger bent substantially perpendicular to the general plane of the plate and in said direction toward the valve member for abutment with said stationary component.

2. The servomotor according to claim 1, wherein said shaft means comprises two facing aligned end portions of a wire clip engaged in outwardly opening aligned holes formed in said valve body.

3. The servomotor according to claim 1, wherein said valve body sealingly slides in a central neck of said casing and further includes an annular member fixedly mounted in said neck and forming said stationary component.

4. The servomotor according to claim 3, wherein said radial recess has an axial end opposite said valve member which comprises an inner flat bearing face for said first portion of said retaining member and an outer axially offset portion.

5. The servomotor according to claim 4, wherein said casing includes an internal annular reinforcement surrounding said central neck and forming at least one abutment surface for said piston structure.

6. A braking assistance servomotor comprising:
   a casing,
   a piston structure dividing said casing internally into two chambers,
   distribution valve means situated in a tubular valve body firmly fixed centrally to said piston structure and actuated by an input member to create selectively a pressure differential between said chambers,
   said distribution valve means comprising:
   a plunger mounted so as to slide axially in said valve body, coupled to said input member and defining at one end a movable valve seat;
   a valve body seat formed internally by said valve body, concentric with said movable valve seat;
   a valve member mounted in said valve body and resiliently biased toward said valve body seat and movable valve seat;
   a return spring supported in said valve body and biasing said input member in a direction away from said valve body and movable valve seat, and
   further comprising a retaining member having a first portion extending into a radial recess in said valve body for cooperation in abutment with a peripheral shoulder of said plunger and a second portion outside said valve body for cooperation with a stationary component in fixed relationship relative to said casing, said retaining member having the second portion pivotingly supported on said valve body by shaft means mounted in said valve body in fixed relationship relative thereto and extending perpendicular to a direction of sliding of said plunger, said radial recess having an axial extension such that, when said retaining member is pivoted about said shaft means in a direction toward said valve member under the effect of said return spring, a zone of said first portion of said retaining member comes into abutment with a corresponding radial end surface of said radial recess adjacent said valve member and remote radially from said shaft means, so as to determine for said plunger a position of maximum retraction relative to said valve body seat.

7. The servomotor according to claim 6, wherein said said retaining member comprises a plate shaped so that said first portion has a U-shaped configuration with a free end cooperating in abutment with said peripheral shoulder of said plunger and said second portion also has a U-shaped configuration with arms extending about each side of said valve body and beyond said free end of said first portion, said arms having free arm ends journaled on said shaft means mounted in said valve body.

8. The servomotor according to claim 7, wherein said shaft means comprises two facing aligned end portions of a wire clip engaged in outwardly opening aligned holes formed in said valve body.

9. The servomotor according to claim 7, wherein said second portion of said retaining member is formed centrally with a finger bent substantially perpendicular to the general plane of the plate and in said direction toward the valve member for abutment with said stationary component.

10. The servomotor according to claim 9, wherein said valve body sealingly slides in a central neck of said casing and further includes an annular member fixedly mounted in said neck and forming said stationary component.

11. The servomotor according to claim 10, wherein said radial recess has an axial end opposite said valve member which comprises an inner flat bearing face for said first portion of said retaining member and an outer axially offset portion.

12. The servomotor according to claim 11, wherein said casing includes an internal annular reinforcement surrounding said central neck and forming at least one abutment surface for said piston structure.

* * * * *